D. SAMAIA.
SWITCH OPERATING MECHANISM.
APPLICATION FILED APR. 13, 1910.
1,070,184.
Patented Aug. 12, 1913.
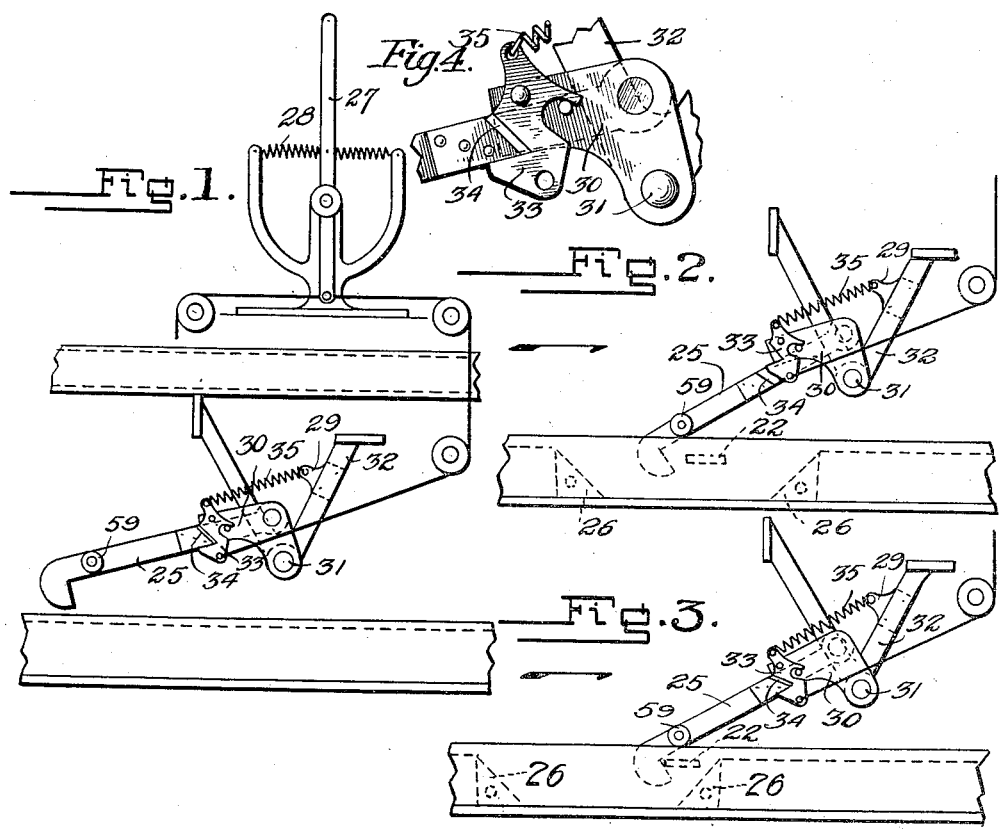
WITNESSES
INVENTOR
Dino Samaia
By B. Singer, Attorney

UNITED STATES PATENT OFFICE.

DINO SAMAIA, OF VICENZA, ITALY.

SWITCH-OPERATING MECHANISM.

1,070,184.

Specification of Letters Patent.

Patented Aug. 12, 1913.

Application filed April 13, 1910. Serial No. 555,253.

*To all whom it may concern:*

Be it known that I, DINO SAMAIA, a subject of the King of Italy, residing at Vicenza, Italy, have invented new and useful Improvements in Switch-Operating Mechanism.

This invention relates to a track switching device suitable for street cars and railroad apparatus.

One of the objects of my invention is to provide a hook, suspended from the vehicle, being adapted to actuate a switch point operating arm when the vehicle or car approaches a switch.

The device of my invention will be more fully described in connection with the accompanying drawing and will be more particularly pointed out in and by the appended claims.

In the drawing:—Figure 1 illustrates one embodiment of my invention with the device thereof in an inoperative position. Fig. 2 is a view similar to Fig. 1 with the device in an operating position. Fig. 3 is a view similar to Fig. 2 showing a different position of the parts. Fig. 4 is an enlarged fragmentary elevation of portions of the device shown in the position illustrated in Fig. 1.

Like characters of reference designate similar parts throughout the different figures of the drawing.

A switch operating arm 22 overlies a portion of the rail. A hook 25 movably disposed on a vehicle serves to actuate the point changing mechanism and may be allowed to engage the projecting arm 22. For the purpose of guiding the hook 25 before it engages said arm 22 and after the release therefrom, inclined portions 26 are provided in the rail.

The hook 25 is pivotally supported on the plate 30 which is pivoted in turn to the frame 32 at the point 31. Frame 32 is fastened underneath the vehicle as clearly shown in Fig. 1. The lever 25 is provided with a cam 34 adapted to be engaged by a pawl 33 pivotally mounted on the plate or angular support 30 as shown. A spring 35 extends from the rigid support 32 to the pawl 33 and serves to hold said pawl normally in this engagement with the cam, and to support the lever 25 and plate 32 in the position shown in Fig. 1.

The lower end of the pawl 33 is connected by a cable to an operating lever 27 suitably mounted above the floor of the vehicle. For the purpose of maintaining the actuating lever in a neutral position, springs 28 are connected with the actuating lever 27.

When the motorman actuates the handle 27, the cable connected with the pawl 33 pulls the latter to the right of the position shown in Fig. 1. This permits the lever 25 to freely descend by gravity into engagement with the rail. When the lever 25 reaches the first inclined portion 26, it drops downwardly, a farther distance, into engaging range with the end of the arm 22, being held in the proper position by the roller 59 which rides on the top of the rail. The sudden engagement resulting from the usual rapid movement of the vehicle necessitates the provision of some kind of yielding movement of the parts to prevent breakage, and this yielding movement is provided for by pivotally mounting the angular support 30. Prior to engagement of the lever 25 with the arm 22, the spring 35 holds the angular support 30 in the position shown in Fig. 2. However, upon engagement of the lever 25 with the arm 22, the sudden pull will move the angular support 30 into the position shown in Fig. 3, thereby tensioning the spring 35. The spring 35 and the pivotal movement of the angular support 30, provides for sufficient longitudinal movement of the lever 25 so as to prevent breakage. The movement of the angular support 30 downwardly to the position shown in Fig. 3 not only provides for a yielding extensible movement of the lever 25, but it also brings the latch 33 into engagement with the lower portion of the lever 25 so as to lock the lever 25 to the angular support 30. When the lever 25 has completely shifted the arm 22 it will then strike the second inclined portion 26 and be instantly lifted thereby to a point above the rail. At the same time, the springs 35 and 28 will tend to restore the parts to the position shown in Fig. 1, and will complete the movement of the parts to the position shown in Fig. 1. It will be understood that the springs 35 and 28 might not act sufficiently quick to move the lever 25 into the position shown in Fig. 1, and therefore the part 26 is desirable to insure the preliminary upward movement of the lever 25.

I claim:—

1. In combination with a switch operating apparatus, of operating mechanism therefor carried by the vehicle or car and comprising a pivotally mounted element, an operating member for said apparatus pivoted on said element and having one portion of a latch device, a latch element having a latch portion coacting with the latch portion of said operating member, a spring connected with said latch element to maintain said pivoted parts in an elevated or non-operative position, and controlling means operating in opposition to said springs and connected with said latch device to release said operating member, substantially as described.

2. In combination with switch rail operating apparatus, of operating mechanism therefor carried by the car or vehicle and comprising a pivoted supporting element, an apparatus operating member and a spring actuated latch controlling element for said member both pivoted on said supporting element, and means connected with said latch element for releasing said operating member, substantially as described.

3. In combination with switch rail operating apparatus, of operating mechanism therefor carried by the car or vehicle and comprising a pivoted supporting element, an apparatus operating member and a spring actuated latch controlling element for said operating member both pivoted on said supporting element, stop means limiting movement of said latch element with respect to said supporting element, and means connected with said latch element for releasing said operating member, substantially as described.

4. In combination with a switch rail apparatus, of operating mechanism therefor carried by the car or vehicle and comprising a pivoted supporting element, a trailing apparatus operating member pivoted on said supporting element, a spring controlled latch normally retaining said operating member in a non-operating or elevated position, means for releasing said member from said latch, and means carried by the track whereby said member is returned into retaining relation with respect to said latch, substantially as described.

In testimony whereof I affix my signature in presence of two witnesses.

DINO SAMAIA.

Witnesses:
W. AUTRY,
I. BARETTE.

---

Copies of this patent may be obtained for five cents each, by addressing the "Commissioner of Patents, Washington, D. C."